(12) United States Patent
Langdon

(10) Patent No.: US 6,731,570 B1
(45) Date of Patent: May 4, 2004

(54) SOUND DETECTION

(75) Inventor: Roger M Langdon, Colchester (GB)

(73) Assignee: BAE Systems Electronics Limited, Farnborough (GB)

( * ) Notice: Subject to any disclaimer, the term of this patent is extended or adjusted under 35 U.S.C. 154(b) by 0 days.

(21) Appl. No.: 09/601,530

(22) PCT Filed: Jan. 18, 1999

(86) PCT No.: PCT/GB99/00151

§ 371 (c)(1), (2), (4) Date: Oct. 23, 2000

(87) PCT Pub. No.: WO99/40398

PCT Pub. Date: Aug. 12, 1999

(30) Foreign Application Priority Data

Feb. 6, 1998 (GB) ................................... 9802688

(51) Int. Cl.[7] .............................. G01S 17/10; G01H 9/00
(52) U.S. Cl. ......................... 367/149; 356/450; 73/657
(58) Field of Search ................................ 367/149, 118; 356/28.5, 450; 73/657; 34/54, 90, 192

(56) References Cited

U.S. PATENT DOCUMENTS

| | | | | |
|---|---|---|---|---|
| 4,645,309 A | * | 2/1987 | Harris et al. ................ 359/311 |
| 5,353,109 A | * | 10/1994 | Langdon et al. ........... 356/28.5 |
| 5,379,270 A | | 1/1995 | Connolly |
| 5,424,749 A | | 6/1995 | Richmond |
| 5,434,668 A | * | 7/1995 | Wooten et al. .............. 356/345 |
| 5,504,719 A | * | 4/1996 | Jacobs ......................... 367/149 |
| 5,847,817 A | * | 12/1998 | Zediker et al. ............. 356/28.5 |
| 6,037,967 A | * | 3/2000 | Allen et al. ................. 347/255 |
| 6,041,020 A | * | 3/2000 | Caron et al. ................ 367/149 |

FOREIGN PATENT DOCUMENTS

EP     0 432 887 A2    6/1991

* cited by examiner

Primary Examiner—Ian J. Lobo
(74) Attorney, Agent, or Firm—Kirschstein, et al.

(57) ABSTRACT

Detection of remote acoustic signals is achieved using a pulse to pulse coherent laser beam which is projected from a telescope to a remote region that contains acoustic signals from a nearby source. Light from the beam is scanned in the region and a resultant signal collected by a telescope. The signal and a reference are applied to an interferometer and the resultant interference pattern applied to a photoreceiver. An alternating current is produced across the photoreceiver which corresponds to the scattered light from the beam caused by the periodic movement of acoustic signals through a region. The detector can be used to determine the curvature of an acoustic signal wavefront and to detect the location of a source producing the acoustic signals.

12 Claims, 2 Drawing Sheets

SOUND DETECTION

BACKGROUND OF THE INVENTION

This invention relates to improvements in or relating to sound detection, in particular to a remote sound detector and a method of remote sound detection.

Acoustic signals are frequently used for detecting and locating remote objects such as guns and vehicles on a battlefield. Sensitive directional acoustic receivers are able to determine the direction of acoustic signals emanating from powerful remote sources with considerable accuracy. This enables the determination of the position of the source from which the acoustic signal is emanating, provided that there are no intervening obstacles to attenuate or diffract the acoustic signal.

There are several known laser techniques used for measuring the velocity of air or airflow from a remote position, for example the measurement of air velocity and airflow profile in a wind tinnel using a laser beam passed into the airflow through a window. A typical technique employs a laser to produce two beams intersecting at an angle at a point within the airflow, producing interference fringes in the region where the beams overlap. Thus particles propelled by the airflow through the fringes produce scattered light which is modulated periodically by the passage of the particles through the fringes. The frequency of modulation, detected by an optical receiver, provides a measurement of the particle velocity and hence the airflow velocity. This technique is difficult to employ effectively at a range of more than a few meters from the laser source. Therefore a different technique is required to make measurements at longer ranges.

One such technique is to employ a single frequency continuous wave laser formed into a beam by a telescope which is focussed on a remote point in the atmosphere where the air velocity is to be measured. Aerosols and dust in the atmosphere scatter a small proportion of the light from the focal region back to the telescope where it is focussed into a parallel beam. The return beam is separated from the outgoing beam by a polarisation switch, typically consisting of a polarising prism and a quarter-wave plate. Light from the laser is polarised in a direction which allows it to pass through the polarising prism in the outgoing direction and it then passes through the quarter-wave plate where it is converted into right-hand circular polarisation. When the beam is scattered by particles at the focal point, the light is substantially converted into left-hand circular polarisation, so that, on its return to the telescope, it passes through the quarter-wave plate and is substantially converted to linear polarisation, but with a direction of polarisation at right angles to that of the outgoing beam. The return beam is reflected by the polarising prism onto a photo detector with a small proportion of the outgoing beam which is reflected from the far face of the quarter-wave plate which returns along the same path as the return beam and is then reflected by the prism onto the photo detector where it forms fringes by interference with the returned beam.

If the particles at the focal point of the beam move with a component of velocity along the beam direction, then the light of the return beam is Doppler shifted with respect to the light of the outgoing beam and the interference fringes move across the photo detector with a frequency equal to the Doppler shift. This causes an alternating photo current to appear on the photo detector at the Doppler frequency. The current is detectable by a suitable signal processing technique such as fast Fourier transform analyser and the velocity of the air passing through the focal point is therefore measurable by determining the frequency of the Doppler signal identified by the fast Fourier transform analyser.

Sound passing through the focal point of the outgoing beam causes periodical variations in air velocity which can be detected if the frequency resolution of the signal analyser is high enough, enabling the sound frequency and amplitude to be determined. However, there are several reasons why the continuous wave system is inefficient in performing such measurements. Firstly, the sample volume needs to be significantly smaller than the acoustic wavelength to efficiently measure the modulation in air velocity due to the acoustic signal passing through it. Secondly, the velocity modulation due to sound, typically one millimeter per second or less, is very small in comparison with atmospheric wind speeds, typically three meters per second such that a detection system is needed which is designed specifically to measure small periodical variations in wind speed rather than the absolute wind speed.

The continuous wave system described above has a range resolution determined by the depth of focus of the laser beam, which is typically one hundred meters or more when the laser beam is focussed at a range in excess of one kilometer. Acoustic wavelengths on the other hand are typically ten meters or less, so the continuous wave system is unable to provide a spatial resolution required.

Furthermore, in practice the source of the acoustic signal is frequently hidden from observers on the ground by undulations in the terrain which prevent the acoustic signals from travelling in a straight line from the source to an observers receiver. In such conditions it is not possible to locate the position of the acoustic signal source with any accuracy and the acoustic signal may be so heavily attenuated by diffraction around intervening terrain that it is undetectable by the observers receiver.

SUMMARY OF THE INVENTION

Prior art document U.S. Pat. No. 5,424,749 (Richmond) teaches a remote sound detector comprises a transmitter operably arranged to produced a train of signals and to transmit the signals into a region of atmosphere as a beam and a receiver operably arranged to receive resultant signals from the region of atmosphere. This document also teaches a method of remote sound detecting comprises transmitting a train of signals into a region of atmosphere as a beam and receiving resultant signals from the region of atmosphere.

It is an object of the present invention to obviate or mitigate the problems associated with the prior art.

According to a first aspect of the present invention the transmitter produces a train of pulse to pulse coherent signals, the receiver is arranged to receive any resultant signals from the intersection of the beam with acoustic signals in the region of the atmosphere and a detector is operably connected to the receiver and arranged to determine the presence of acoustic signals from the phase difference between successive resultant signals. The detector may determine phase differences between immediated successive pairs of resultant signals.

A laser source may be operably arranged to produce a laser beam and the laser beam may be modulated by a modulator to produce the train of signals.

The beam may be directed to a region in the atmosphere above possible sources of acoustic signals hidden from a field of view of an observer.

An interferometer may be operably arranged to provide an interference pattern between the laser beam and each resultant signal. A photoreceiver may be operably arranged to detect and produce an output signal corresponding to changes in each interference pattern. A sampler may be operably arranged to sample the output signals from the photoreceiver and a comparator may be operably arranged to compare output signals from immediate successive pairs of outputs from the photoreceiver to produce a result. An accumulator may be operably arranged to accumulated each result and a loudspeaker may be operably arranged to reproduce an audible output of the result.

The sampler may be operably arranged to sample the output signals from the photoreceiver at different ranges to the regions and a processor may be arranged to determine the curvature of an acoustic signal wavefront from a possible source, to determine a first circle from the wavefront substantially perpendicular to the beam which intersects the acoustic signal, to calculate a second circle as for the first circle with a beam directed to a different region and to locate the possible source of acoustic signal as the point that the first and second circles join.

According to a second aspect of the present invention the method of remote sound detecting including transmitting a train of pulse coherent signals into the region of the atmosphere, receiving any resultant signals from the intersection of the beam with acoustic signals in the region of the atmosphere, and determining the presence of acoustic signals from the phase difference between successive resultant signals.

The method may also include determining the phase difference immediate successive pairs of resultant signals.

The method may include producing the train of signals by producing a laser beam and modulating the laser beam.

The method may further include directing the beam to a region in the atmosphere above possible sources of acoustic signals hidden from a field of view of an observer.

The method may include providing an interference pattern between the laser beam and each resultant signal and detecting and producing an output signal corresponding to changes between each interference pattern. The method may include sampling the output signal and comparing output signals from immediate successive pairs of output signals and producing a result. The method may further include accumulating each result and providing an audible output of the result.

The method may also include sampling the output signal at different ranges to the regions, determining the curvature of an acoustic signal wavefront from a possible source, determining a first circle from the wavefront substantially perpendicular to the beam which intersects the acoustic signal, calculating a second circle as for the first circle with a beam directed to a different region and locating the possible source of acoustic signal as the point that the first and second circles join.

BRIEF DESCRIPTION OF THE DRAWINGS

The invention will now be described, by way of example only, with reference to the accompanying drawings, in which.

DETAILED DESCRIPTION OF THE PREFERRED EMBODIMENTS

Figure 1:
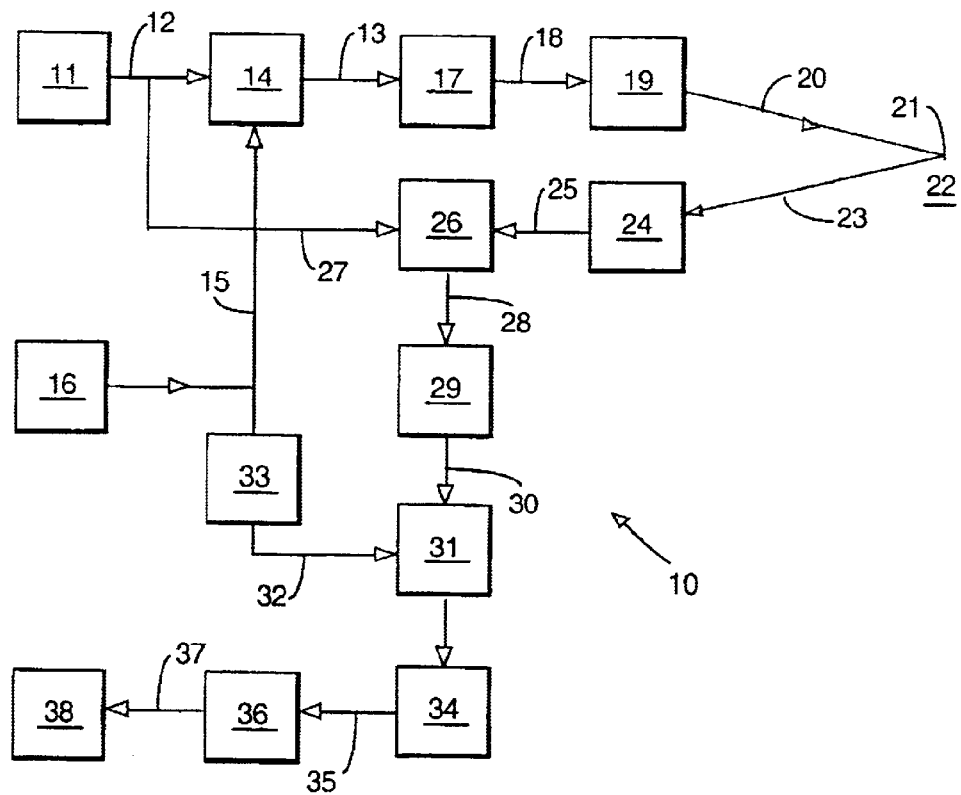
FIG. 1 is a schematic diagram of a remote sound detector.

In FIG. 1 a remote sound detector 10 comprises a single frequency laser 11 which produces an output 12 which has a high frequency stability and which is chopped into short laser pulses 13 by an optical modulator 14 controlled by a pulse 15 from a pulse generator 16. The laser pulses 13 are amplified by an optical amplifier 17 to produce amplified pulses 18 which are to projected through a telescope 19 as a beam 20 to a remote region 21 in the atmosphere 22 which contains acoustic signals from a nearby source, not shown.

Light from the beam 20 is scattered by aerosols and dust particles in the atmosphere 22 in the vicinity of remote region 21 and a resultant signal 23 is collected by a telescope 24 and focussed into a parallel beam 25 The parallel beam 25 passes into an optical interferometer 26 where it is allowed to interfere with light 27 tapped off from the laser output 12 and the resultant interference pattern 28 is allowed to fall on a photoreceiver 29 which is sensitive to the wavelength of the laser output 12. The two beams 12, 25 in the interferometer 26 are substantially aligned such that the photoreceiver 29 intercepts less than one interference fringe.

Light from the beam 20 scattered in the vicinity of remote region 21 is changed in frequency by the Doppler effect, caused in part by movement of aerosols and dust particles by the wind, and in part by their periodic movement caused by the passage of acoustic signals through region 21. The Doppler shift causes optical fringes produced by the interferometer 26 to move across the photoreceiver 29 with a velocity which produces an alternating current 30 in the photoreceiver 29 at the Doppler frequency.

The amplitude and phase of the alternating current 30 is recorded by a data recorder 31 which holds a short record of the alternating current 30 from each pulse 18 which has been scattered from the vicinity of the region 21. The recording process is initiated by trigger pulses 32 produced from the leading edges of the pulses 18 which correspond to pulses 15 produced by the pulse generator 16 but with a delay circuit 33 which produces a delay of the time taken for the beam 20 to travel from the telescope 19 to the remote region 21 and back to telescope 24. The recording process continues after the receipt of a trigger pulse 32 for a time approximately equal to the duration of pulse 18.

The phase of the alternating current 30 produced for each pulse 18 is compared in a phase comparator 34 with the phase of the alternating current 30 produced by a previous pulse 18 separated in time by an integral number of pulse 18 intervals and results 35 are accumulated as a running total in an accumulator 36.

The running total obtained from a fixed number of successive pairs of pulses 18 forms an output 37. The fixed number of pulses 18 used must be smaller than the pulse 18 repetition frequency divided by the largest acoustic signal frequency to be detected. The output 37 therefore represents the phase difference between pairs of successive pulses 18 applied to phase comparator 34 averaged over a time shorter than the smallest acoustic signal period. As the acoustic signal passes through the remote region 21 the output 37 will be proportional to the rate of change of phase of the resultant signal 23 and will therefore be proportional to the alternating component of air velocity at region 21. The output 37 therefore represents the amplitude of the acoustic signal passing through region 21 which can be recorded or reproduced in a convenient manner, for example reproduced on a loudspeaker 38.

Figure 2:
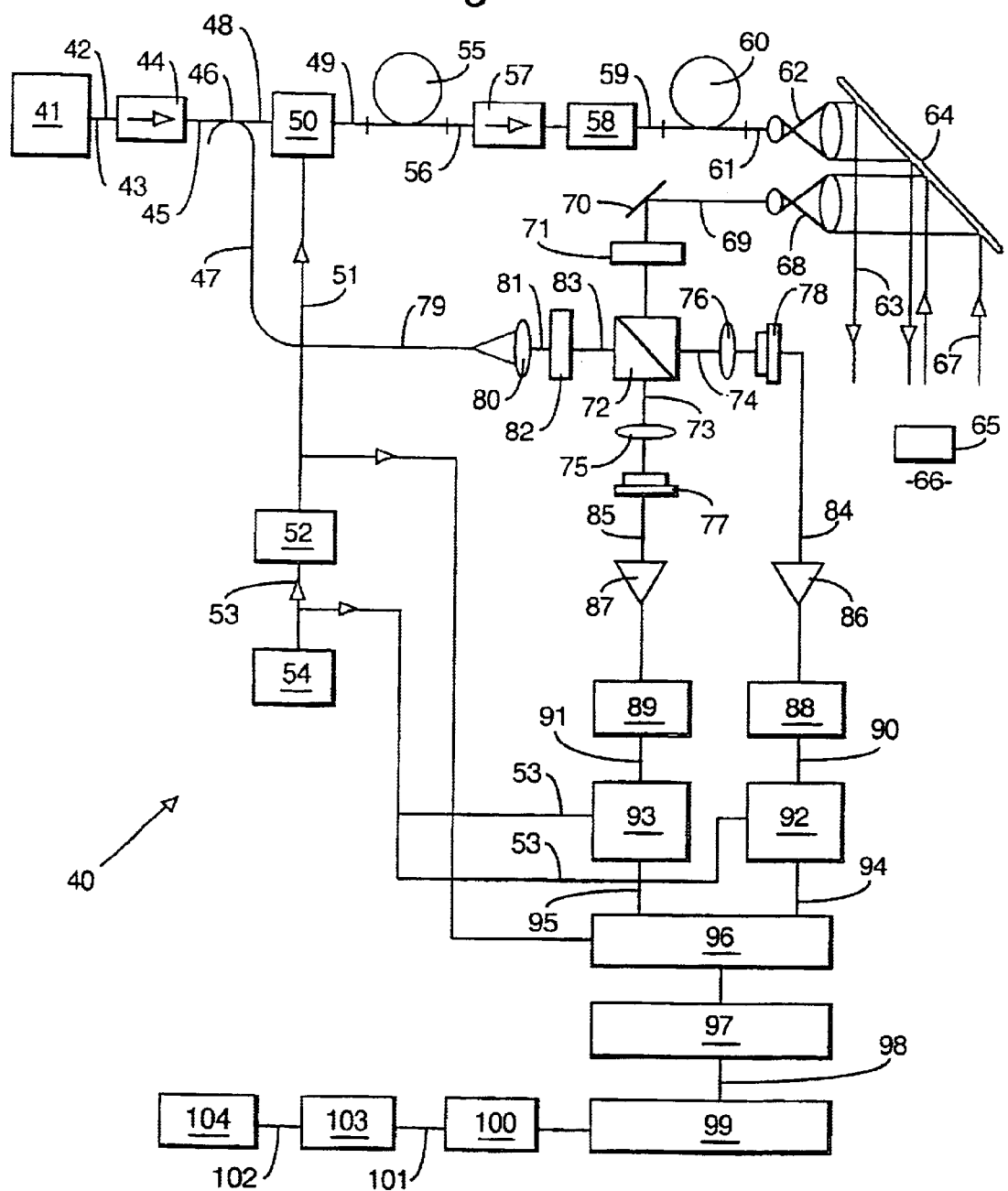
FIG. 2 is a more detailed schematic diagram of a remote sound detector.

In FIG. 2 a more detailed embodiment of the remote sound detector in FIG. 1 is given. A remote sound detector 40 comprises a transmitter section having a single frequency laser 41 of very high frequency stability, and may be for example a short erbium-doped optical fiber laser with a distributed grating resonator, which produces a low power continuous wave output 42 at a suitable wavelength and with a spectrum line width of 10 KHz or less. The continuous wave output 42 may be chosen to have an eye-safe wavelength, for example 1.55 micrometers and may have an output power level of approximately 5 milliwatts. The laser output 42 needs to be linearly polarised and is passed via a single mode polarisation maintaining optical fiber 43 to an efficient isolator 44 which prevents light reflected from other parts of the detector 40 from interfering with the frequency stability of the laser 41.

An output 45 from the isolator 44 passes through a polarisation maintaining optical fiber coupler 46 which taps off a small proportion of the light from the laser 41 to form a reference wave 47 for a receiver section of the detector 40, which is explained in greater detail below.

The remaining light 48 which emerges from the coupler 46 is converted into a regular stream of short pulses 49 by a fast electro-optic modulator 50. The pulses 49 are typically 50 nano seconds long with a spacing of 20 microseconds. The modulator 50 is control led by a signal 51 from a pulse generator 52 triggered by a clock pulse 53 from a clock pulse generator 54 operating at a frequency greater than or equal to the inverse of the pulse 49 duration. The pulses 49 pass into a high gain optical fiber pre-amplifier 55 which has typically an unsaturated gain of approximately 30 decibels and is able to produce a peak; output signal 56 of approximately 5 watts when driven from a 5 milliwatt laser output 42 with a mean output power of 12.5 milliwatts.

The output signal 56 passes through a second isolator 57 and through a narrow band filter 58 to produce a signal 59 which is used to feed an optical fiber power amplifier 60. The isolator 57 and the narrow band filter 58 produce a signal 59 which prevents amplified spontaneous to emission from the pre-amplifier 55 from saturating the subsequent amplifier 60. The signal 59 passes through the amplifier 60 which is selected to have a typical gain of approximately 20 decibels and which gives a peak power output pulse 61 of approximately 500 watts with a mean power of 1.25 watts.

The power output pulse 61 is linearly polarised by either using polarisation-maintaining fibres in the construction of both amplifiers 55, 60 or by incorporating an adjustable polarisation corrector at the output of amplifier 60.

The output pulse 61 is expanded to approximately 80 millimeters in diameter by a telescope 62 to form a beam 63 which is directed by a plane mirror 64 to form a focus on a region 65 of the atmosphere 66 which could contain acoustic signals produced by a nearby source, not shown, at a range of several kilometers from the telescope 62.

Light from the beam 63 in the region 65 is scattered by atmospheric aerosols and dust and forms resultant signal 67 which returns to the plane mirror 64 substantially linearly polarised. The resultant signal 67 is directed by the plane mirror 64 through a second telescope 68 which forms a parallel beam 69 approximately 1 millimeter in diameter. The parallel beam is reflected by a further plane mirror 70 through a half-wave plate 71 into an output of a polarising beam splitter 72. The orientation of the half-wave plate 71 is adjusted so that the parallel beam 69 is polarised at an angle of 45 degrees to the principle axis of the beam splitter 72 such that substantially equal power signals are transmitted from two orthogonally polarised outputs 73, 74 from the beam splitter 72, which are then focussed by lenses 75, 76 onto photo-diodes 77, 78.

The photodiodes 77, 78 are sensitive to the optical wavelengths used and can be made from germanium or indium-gallium arsenide to efficiently detect a laser wavelength of 1.55 micrometers. The reference wave 47 is conducted by a polarisation-maintaining optical fiber 79 to a collimator lens 80 to form a parallel reference beam 81 approximately one millimeter in diameter which is passed through a quarter-wave plate 82 into an unused input port of the beam splitter 72. The reference wave 47 comprises linearly polarised light which is converted into circularly polarised light 83 by the quarter-wave plate 82.

Two reference beams of equal intensity are therefore produced at the outputs 73, 74 of the beam splitter 72, but having relative phases differing by 90 degrees. The position and angles of the power signal and reference beam emerging from each polarised output 73, 74 of the beam splitter 72 are adjusted to make them substantially parallel and coaxial so that optical interference occurs between each power signal and its reference beam.

The photo-diodes 77, 78 produce signal currents 84, 85 which contain al alternating components at the Doppler frequency caused by the motion of scattering particles in the region 65. The two signals 84, 85 will have substantially the same amplitude, but owing to the 90 degree phase shift between each power signal and its reference beam applied to the photo-diodes 77, 78 they will be out of phase by 90 degrees. These currents 84, 85 are referred to as in-phase and quadrature components. The currents 84, 85 are amplified by amplifiers 86, 87 and are band limited by passing the amplified currents through identical low-pass filters 88, 89 which limit their frequencies to a range sufficient to allow pulses 61 to pass and hence limit the receiver noise to a minimum value.

Resultant filtered signals 90, 91 are then sampled by analog-to-digital converters 92, 93 which operate on the clock pulse 53 from the clock pulse generator 54. Samples 94, 95 are then stored in a memory 96. Only a short sequence of samples 94, 95 from each arm of the receiver are stored, approximately corresponding to the total duration in the pulse 61 formed in transmitter derived from the pulse 51 generated by the pulse generator 52, but delayed by the time required for the pulse 61 in the beam 63 to travel to the region 65 and back to the receiver as resultant signals 67. The samples 94, 95 stored in the memory 96 therefore correspond to the in-phase and quadrature components of the Doppler signal from the region 65 alone.

Samples 94, 95 for a long sequence of pulses 61 produced by a transmitter are stored separately in memory 96. In order to obtain the phase difference between one sample and the next, the complex covariance of each sample 94, 95 is calculated with the corresponding sample from the following pulse 61 produced by the transmitter in a complex covariance processor 97 and the results 98 are stored in an accumulator 99 as a running total.

To calculate the complex covariance, the complex amplitude of each sample 94, 95, which represent the in-phase and quadrature components, is multiplied by the negative of the complex conjugate of the corresponding sample 94, 95 from the following pulse 61 produced by the transmitter. The argument of the complex convariance is the phase difference between the Doppler signals from the two samples 94, 95. The complex covariance calculation is repeated for a sequence of sample pairs of total duration equal to the pulse 61 length and the results 98 are added together in the accumulator 99. The process is repeated using samples 94, 95 received from each subsequent pair of pulses 61 with all the results added together as a running total in the accumulator 99. The accumulator 99 maintains a running total for a number of pulse pairs approximately equal to the pulse repetition frequency divided by twice the maximum acoustic frequency to be detected. The running total in the accumulator is therefore the covariance of the samples 94, 95 averaged over approximately half the acoustic period. Finally, the argument 100 of the convariance total is calculated in a processor 100 giving an output 101 equal to the rate of change of phase of the Doppler signal. The output 101 can either be stored and displayed on a suitable display means, or can be reconstituted as an acoustic signal 102 by passing it through a digital-toanalogue converter 103 and reproducing the result on a loudspeaker 104.

As the transmitter pulse repetition frequency is high, for example 50 KHz, the air velocity in the sample volume will not change significantly from one pulse 61 to the next. The resultant signal 67 for each pulse 61 will therefore have the same fixed Doppler frequency with a small phase modulation imposed on it due to passage of acoustic signals through the beam 63. The complex signal currents 84, 85 from the two photo-diodes 77, 78 arising from two adjacent pulses 61 can be represented by $I_1(t)$ and $I_2(t)$ where $$I_1(t)=(I_1^i+jI_1^q)=I_1 \exp[j(\omega_d t+\phi_1)]+\text{noise}$$

and $$I_2(t)=(I_2^i+jI_2^q)=I_2 \exp[j(\omega_d t+\phi_2)]+\text{noise}$$

where $\omega_d$ is the Doppler angular frequency t is the time, and $\phi_1$ and $\phi_2$ are the signal phases for the two pulses in the resultant signal 67. Superscript i and q represent the in-phase and the quadrature components for each signal current 84, 85 respectively and I is their root means square amplitude. The complex covariants formed in the processor are $$R(t) = I_1(t) \times I_2(t) = I_1 I_2 \exp[j(\omega_d t + \phi_1)] \times \exp[-j(\omega_d t + \phi_2)] + noise$$
$$= I_1 I_2 \exp[j(\phi_1 - \phi_2)] + noise$$

The noise terms are symmetrical about zero, so when it is integrated over a large number of samples 94, 95 the noise will average to zero while the exponential argument will tend to be a fixed value. The mean phase difference between the Doppler signals from adjacent pulse pairs will therefore be $$\phi_1-\phi_2=\arg(\overline{R(t)})$$

where $$\overline{R(t)} = \sum_n R_n(t)$$

where n is the number of pulse pairs in the running total.

The ability of the detector 40 to detect acoustic signals from a remote source depends on a number of factors. For example the signal to noise ratio of the processed output 98 of the receiver, noise introduced by the turbulence of the atmosphere, and noise introduced by random movement of scattering particles in the region 65.

Scattering particles in the atmosphere consist partly of microscopic water droplets formed from atmospheric water vapour and partly from dust particles of various shapes and sizes suspended in the atmosphere by air currents. Dust particles are particularly plentiful at low altitude over land and studies of the size distribution of these particles suggest that the majority are of the micrometer size. Small particles suspended in the atmosphere experience Brownian motion due to random collision with air molecules. Kinetic theory shows that for particles of one micrometer in diameter the mean velocity in any particular direction is roughly three millimeters per second. The resultant signal 67 received back at the receiver will therefore record a random Doppler signal corresponding to a root mean squared velocity of three millimeters per second which is superimposed on any velocity fluctuations due to acoustic signals. This is equivalent to an acoustic noise level of nearly one hundred decibels, so that the source of acoustic signal would need to be very powerful to be detected. In practice however, the beam 63 intercepts a very large number of scattering particles simultaneously, so random Doppler signals arising from individual particles are averaged out in the receiver to produce a very much lower Doppler frequency fluctuation.

Statistical analysis shows that if N particles are present within the scattering volume, then the mean noise amplitude due to Brownian motion is reduced in proportion to $N^{-1/2}$, assuming that all particle have equal weight. In practice N can be as high as $10^5$ or $10^6$ for a beam 63 focussed at a range of 1 kilonetre or rore, so that the equivalent acoustic noise level due to Brownian motion is likely to be forty or fifty decibels rather than one hundred decibels for a single particle. The Brownian noise is spread over a large bandwidth, whereas the acoustic signals from sources such as vehicle engines are spread over a range of a few Hertz to one Kilohertz at most and contain specific frequency characteristics of the engine rotation rate. The portion of the Brownian noise spectrum covering the frequency range of interest is therefore very small, so the effective background noise it generates is likely to be substantially less than the forty decibels calculated above. This would make it comparable with or less than the level of background noise normally present in the environment, so represents no limitations on the ability of the system to detect acoustic signals.

Thermal turbulence in the atmosphere causes the atmospheric refractive index to vary in a random way, both spatially and temporally. The beam 63 which passes through the atmosphere 66 to the region 65 and, as the resultant signal 67, back to the receiver experiences random fluctuations in the optical path length due to this effect, which can produce noise on the received signal at the telescope 68. Turbulence is produced by thermal gradients in the atmosphere 66 which drive convection currents and is a particular problem for any beam propagating at low altitudes where thermal gradients are large due to solar heating of the earth. However, convection is normally very slow because it is driven by thermal forces, so the noise spectral density produced by thermal turbulence normally decreases very rapidly with frequencies above a few hertz. Wind blowing in a direction transverse to the beam 63 blows turbulence across the beam 63 however, which increases the noise level at acoustic frequencies substantially. The turbulence noise spectral density introduced into the beam 63 which travels along a path z to a region 65 and as a resultant signal 67 back to the receiver is $$p_n(f)=\rho c_a \sqrt{0.317 z C_n^2 f^{-2/3} V^{5/3}}$$

where $C_n^2$ is the atmospheric refractive index structure constant, $\rho$ is the density of air, $c_a$ is the sound velocity in air, f is the acoustic frequency, and V is the wind velocity blowing transversely across the beam 63. $p_n(f)$ is the turbulence noise spectral density in terms of equivalent acoustic noise in pascals per root bandwidth at frequency f. Taking $C_n^2$ to be $3\times10^{-14}$ m$^{-23}$, which is a typical value measured a few meters above the earth, the turbulence noise for a three meters per second cross-wind at a range of one kilometer is 3.5 $\mu Pa/Hz^{1/2}$ at a frequency of ten hertz, decreasing to 0.8 $\mu Pa/Hz^{1/2}$ at one thousand hertz. The total turbulence noise over a spectrum of a thousand hertz is therefore about 60 $\mu Pa$ which is ten decibels. This is likely to be very small in comparison with the acoustic signal level, so turbulence noise is unlikely to interfere with acoustic signal measurement unless the atmosphere is exceptionally turbulent or the transverse wind velocity is very high.

The beam 63 which produces a mean output power $P_t$ with a pulse length $t_p$ at a pulse interval $\tau$, the signal to noise ratio SRN obtained at the outputs of the photo-diodes 77, 78, before signal processing is $$SNR = \frac{\pi \eta P_t t_p \tau R_a^2 \beta \lambda}{2hz^2} \exp(-2\alpha z)$$

where $\eta$ is the quantum efficiency of the photo-diodes, $R_a$ is the radius of the transmitted beam 63, $\beta$ is the atmospheric backscatter coefficient in units of $m^{-1} sr^{-1}$, $\lambda$ is the laser wavelength, $\alpha$ is the atmospheric attenuation coefficieny, z is the range of the region 65 and h is Planck's constant. This assumes that the receiver bandwidth, limited by filters 88, 89 is set to $1/t_p$. An acoustic signal passing through the region 65 with a sound pressure $p_a$ produces velocity perturbations in the atmosphere of a magnitude $v_a$ where $$v_a = \frac{p_a}{\rho c_a}$$

where $\rho$ is the atmospheric density, and $c_a$ is the velocity of sound. When the phases of the Doppler signals produced by two adjacent pulses 61 are compared by the covariance processor 97, the resulting phase difference $\phi_a$ is given by $$\phi_a = \frac{4\pi v_a \tau}{\lambda}$$

When a total of N pulse pairs are processed by the covariance processor 97, the signal to noise ratio of the results 98, that is the power in the waveform representing the acoustic signal divided by the noise power, is $SNR_p$ where $$SNR_p = \phi_a^2 \left( \frac{1}{SNR\sqrt{2N}} + \frac{1}{\sqrt{SNR \times N}} \right)^{-2}$$

If the maximum frequency present in the acoustic signal is $f_a$ then it can be shown that the acoustic signal amplitude of the results 98 at the receiver output, reaches a maximum when $N=0.42/\tau f_a$. This therefore provides the condition for containing maximum signal to noise ratio for the results 98 at the processor 97.

Figure 3:
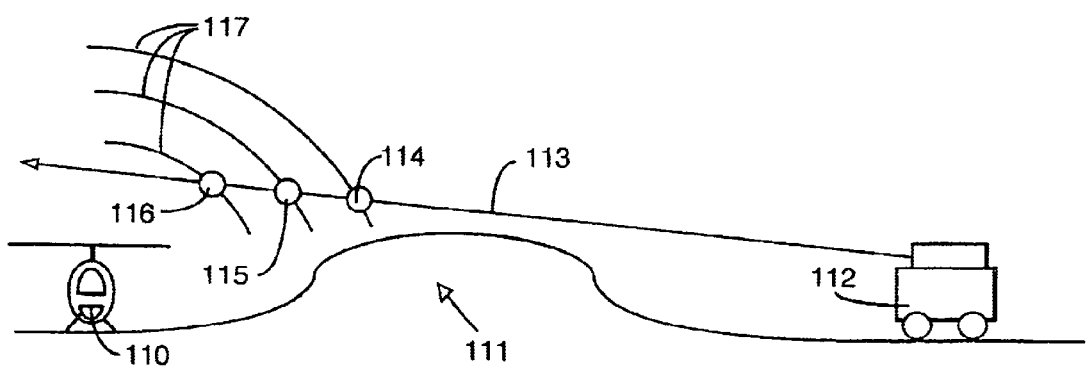
FIG. 3 illustrates the remote sound detection of acoustic signals emanating from a hidden source.

In FIG. 3 a helicopter 110 situated on the ground, which is hidden by buildings or undulating terrain 111 from observers 112 located several kilometers from the helicopter 110. The helicopter 110 has its rotor spinning which produces a large amount of acoustic signal power at the low harmonics of the rotation rate. The acoustic signal power will be in the region of one hundred decibels or two pascals at a distant of one hundred meters above the helicopter 110. The observers 112 direct a beam 113, as described with reference to FIGS. 1 and 2 above, over the terrain 111. The beam 113 has a mean power of one watt at a wavelength of 1.55 micrometers, with a pulse length of fifteen nanoseconds and a pulse repetition frequency of fifty thousand pulses per second. The beam 113 is directed over the undulating terrain 111, to arrive at a point one hundred meters above the helicopter 110 where the acoustic signal is sampled. Assuming that principal acoustic frequency due to the rotor of the helicopter 110 is ten hertz, the processed signal to noise ratio derived from the above equations is 23 decibels at a range of three kilometers, if it is assumed that low atmospheric attenuation ($\alpha=10^{-4}n^{-1}$) and low atmospheric turbulence. This will be more than sufficient to provide an indication of the presence of the helicopter 110 and can provide sufficient information to locate the helicopter position.

The location of the helicopter 110 is determined by passing the beam 113 through the acoustic signal field emitted by the helicopter 110. The acoustic signals from the helicopter 110 are sampled at several points 114, 115, 116 along the path of the beam 113. Although only three sample points 114, 115, 116 are shown along beam 113 it will be understood that a substantially greater amount of sample points are used by the detector.

The sampling is provided by altering the range settings of the detector to sample acoustic signals from the points 114, 115, 116 in sequence. Alternatively the detector can contain several parallel processors which are arranged to sample and process the resultant signal from points 114, 115, 116 simultaneously. The amplitude and phase of a particular harmonic of the helicopter blade 110 rotation rate is therefore obtained at the sample points 114, 115, 116. The acoustic signal emitted by the helicopter 110 produces spherical waves 117 which radiate from the source and by comparison of the phases of the waves 117 received at points 114, 115, 116 the curvature of the acoustic signal wavefront can be calculated.

A first circle perpendicular to the beam 113 can be defined and will contain the sound source. The beam 113 is then moved to a slightly different position and the above described process repeated to provide a second circle which also contains the sound source 110. The point where the two circles join is the position of the helicopter 110.

What is claimed is:

1. A remote sound detector for detecting a hidden source of acoustic signals, comprising:

a) a transmitter including a laser source operably arranged for producing a laser beam, and a modulator for modulating the laser beam to produce a train of pulse to pulse coherent signals, and the transmitter being operable for transmitting the signals as a beam into a region of atmosphere which is located above the hidden source of the acoustic signals;

b) a receiver operably arranged for receiving resultant signals from an intersection of the beam with the acoustic signals in the region of atmosphere;

c) an interferometer operably arranged for providing an interference pattern between the laser beam and each resultant signal;

d) a detector including a photoreceiver operably arranged for detecting and producing an output signal corresponding to changes in each interference pattern, and operably connected to the receiver and arranged for determining a presence of the hidden source of the acoustic signals from a phase difference between successive resultant signals; and e) a sampler operably arranged for sampling the output signals from the photoreceiver, and a comparator operably arranged for comparing the output signals from immediate successive pairs of outputs from the photoreceiver to produce a result.

2. The remote sound detector of claim 1, wherein an accumulator is operably arranged for accumulating each result.

3. The remote sound detector of claim 1, wherein a loudspeaker is operably arranged for reproducing audible output of the result.

4. The remote sound detector of claim 1, wherein the sampler is operably arranged for sampling the output signals from the photoreceiver at different ranges to the hidden source, and a processor is arranged for determining a curvature of an acoustic signal wavefront from the hidden source, for determining a first circle from the wavefront substantially perpendicular to the beam which intersects the acoustic signals, for calculating a second circle as for the first circle with the beam directed to a different range, and for locating the hidden source of the acoustic signals as the point that the first and second circles join.

5. A method of remote sound detecting a hidden source of acoustic signals, comprising the steps of:
 a) producing and modulating a laser beam to produce a train of pulse to pulse coherent signals, and transmitting the train of signals as a beam into a region of atmosphere which is located above the hidden source of the acoustic signals;
 b) receiving resultant signals from an intersection of the beam with the acoustic signals in the region of atmosphere;
 c) providing an interference pattern between the laser beam and each resultant signal;
 d) detecting and producing an output signal corresponding to changes between each interference pattern;
 e) determining a presence of the hidden source of the acoustic signals from a phase difference between successive resultant signals; and
 f) sampling the output signal, comparing the output signals from immediate successive pairs of the output signals, and producing a result.

6. The method of claim 5, including accumulating each result.

7. The method of claim 5, including providing an audible output of the result.

8. The method of claim 5, wherein the sampling of the output signal is performed at different ranges to the hidden source, and the steps of determining a curvature of an acoustic signal wavefront from the hidden source, determining a first circle from the wavefront substantially perpendicular to the beam which intersects the acoustic signals, calculating a second circle as for the first circle with the beam directed to a different range, and locating the hidden source of the acoustic signals as the point that the first and second circles join.

9. A remote sound detector for detecting a hidden source of acoustic signals, comprising:
 a) a transmitter operably arranged for producing a train of pulse to pulse coherent signals and for transmitting the signals as a beam into a region of atmosphere which is located above the hidden source of the acoustic signals;
 b) a receiver operably arranged for receiving resultant pulse signals from an intersection of the beam with the acoustic signals in the region of atmosphere; and
 c) a detector operably connected to the receiver and arranged for determining a presence of the hidden source of the acoustic signals by comparing phases of successive resultant pulse signals to obtain phase differences, and by accumulating the phase differences for subsequent successive resultant pulse signals to obtain an output signal indicative of the presence of the hidden source of the acoustic signals.

10. The remote sound detector of claim 9, wherein the detector is operative for determining the phase differences between immediate successive pairs of the resultant pulse signals.

11. A method of remote sound detecting a hidden source of acoustic signals, comprising the steps of:
 a) transmitting a train of pulse to pulse coherent signals as a beam into a region of atmosphere which is located above the hidden source of the acoustic signals;
 b) receiving resultant pulse signals from an intersection of the beam with the acoustic signals in the region of atmosphere; and
 c) determining a presence of the hidden source of the acoustic signals by comparing phases of successive resultant pulse signals to obtain phase differences, and by accumulating the phase differences for subsequent successive resultant pulse signals to obtain an output signal indicative of the presence of the hidden source of the acoustic signals.

12. The method of claim 11, including determining the phase differences between immediate successive pairs of the resultant pulse signals.

\* \* \* \* \*